(No Model.) 2 Sheets—Sheet 1.
J. E. PERKINS.
CORN HARVESTER.
No. 506,541. Patented Oct. 10, 1893.
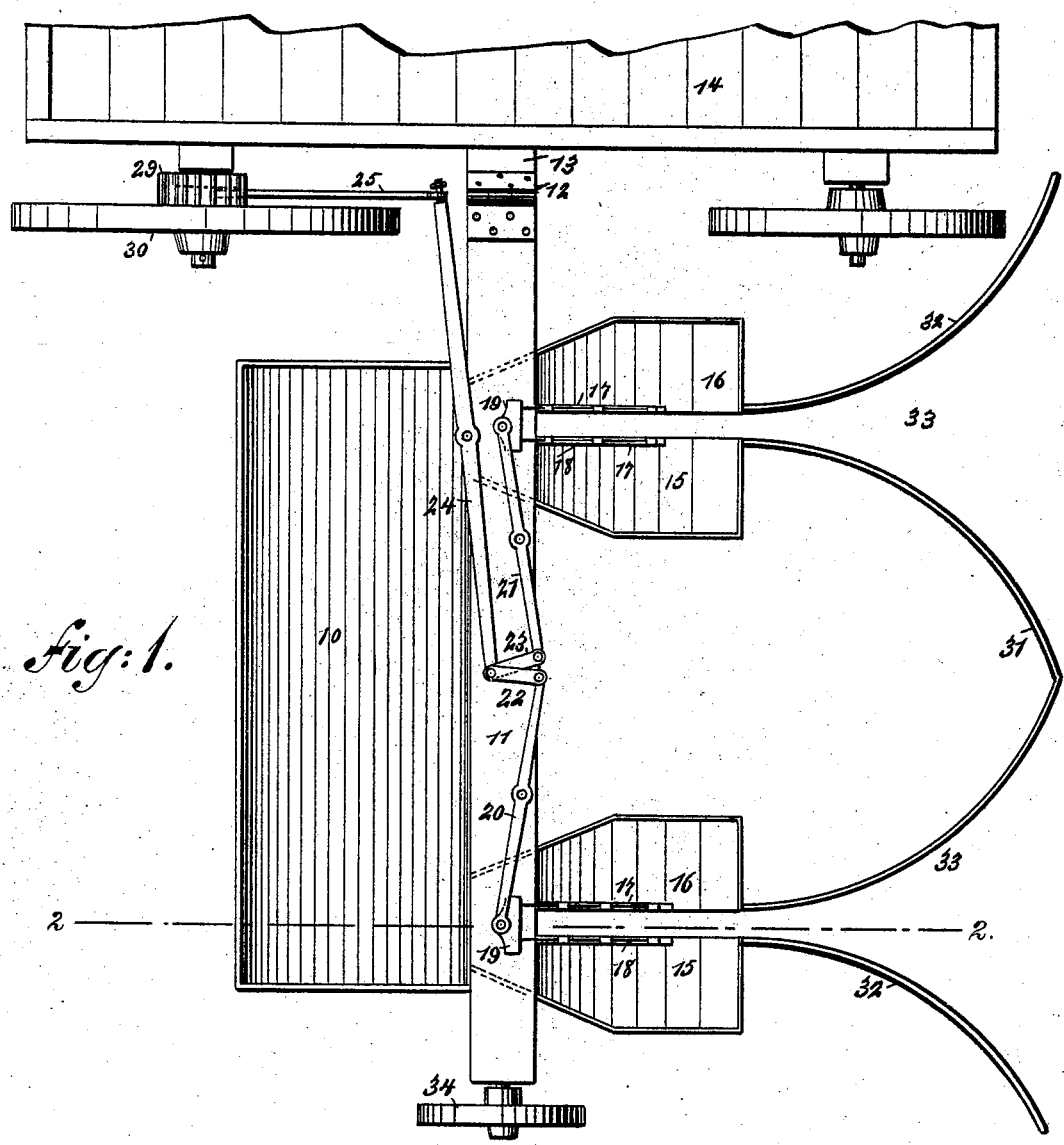
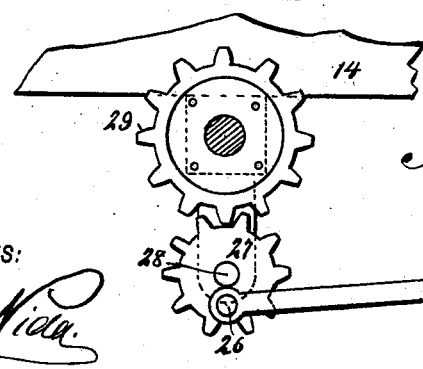
WITNESSES:
INVENTOR
ATTORNEYS.

(No Model.) 2 Sheets—Sheet 2.
J. E. PERKINS.
CORN HARVESTER.
No. 506,541. Patented Oct. 10, 1893.
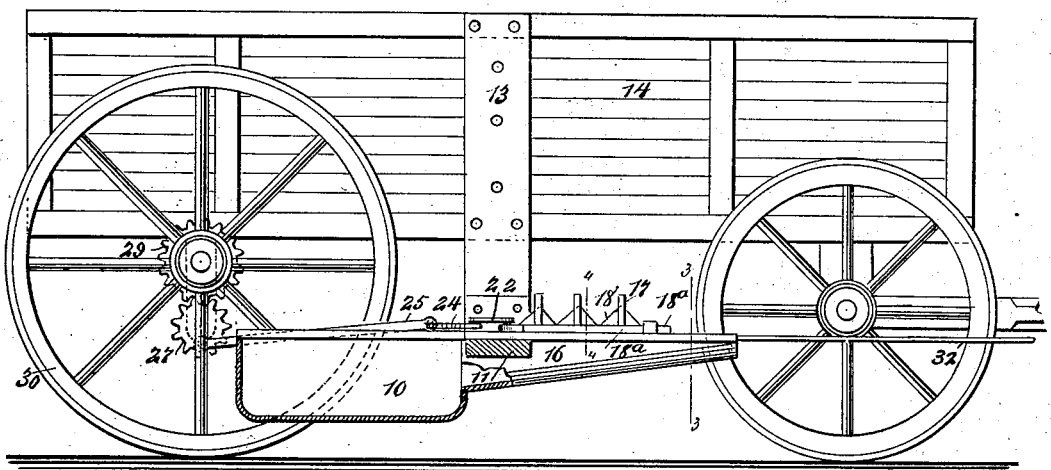
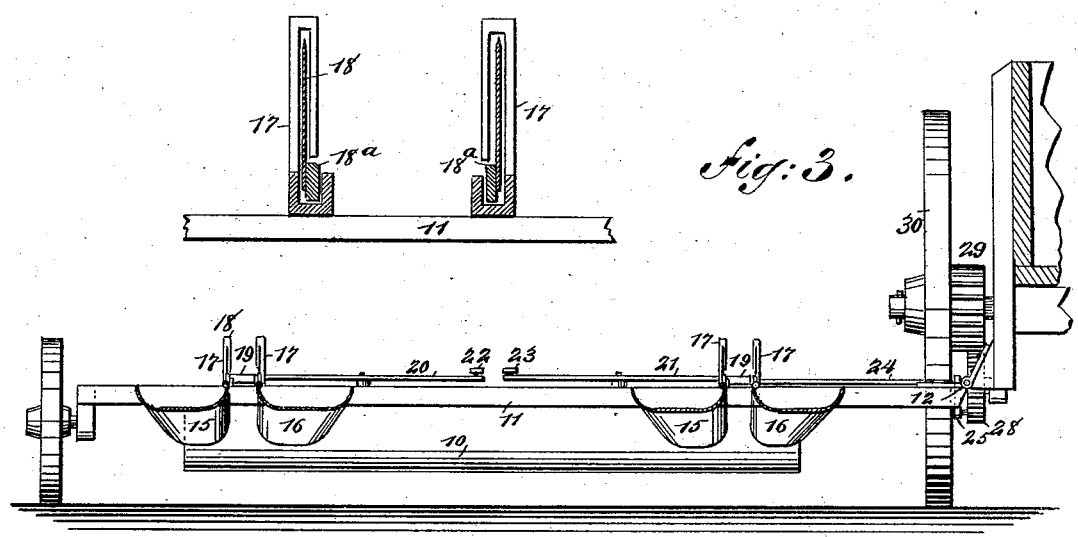
WITNESSES:
Chas. Niera.
C. Sedgwick.
INVENTOR
J. E. Perkins
BY Munn & Co
ATTORNEYS.

UNITED STATES PATENT OFFICE.

JAMES EDWARD PERKINS, OF BROWNWOOD, TEXAS.

CORN-HARVESTER.

SPECIFICATION forming part of Letters Patent No. 506,541, dated October 10, 1893.

Application filed December 28, 1892. Serial No. 456,546. (No model.)

*To all whom it may concern:*

Be it known that I, JAMES EDWARD PERKINS, of Brownwood, in the county of Brown and State of Texas, have invented a new and useful Improvement in Corn-Harvesters, of which the following is a full, clear, and exact description.

My invention relates to an improvement in corn harvesters, and has for its object to provide a machine of exceedingly simple and durable construction, capable when drawn over a field of corn of cutting the ears of corn from two rows simultaneously, and of depositing the cut corn in a receiver at the rear of the cutters.

Another object of the invention is to provide a machine capable of being attached to any farm wagon, it being intended to transfer the ears of corn from the receiver to the wagon.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1 is a plan view of the machine, illustrating its application to a farm wagon. Fig. 2 is a side elevation of the farm wagon, the machine being in vertical longitudinal section, the section being taken practically on the line 2—2 of Fig. 1. Fig. 3 is a transverse section taken practically on the line 3—3 of Fig. 2. Fig. 4 is a transverse section taken through the cutters, practically on the line 4—4 of Fig. 2; and Fig. 5 is a detail view of the gearing between the machine and the farm wagon.

In carrying out the invention the harvesting machine consists of a receiver 10, which receiver is a receptacle preferably constructed of sheet metal so as to be light and durable, and this receiver is attached to a body beam 11, the beam passing over the upper forward portion of the receiver; the body beam is adapted to be connected by means of a hinge 12 with an upright 13, attached to the side of a common farm wagon 14, the upright being placed between the wheels and extending downward below the body of the wagon, as shown in Fig. 2.

At each side of the receiver 10 two chutes 15 and 16, are located, each set of chutes being placed a slight distance apart. The chutes are downwardly inclined, are widest at their forward ends, and their lower tapering ends enter the reservoir 10, whereby any material deposited in the chutes will slide down and find its way into the receiver.

At the inner or opposing edges of each chute of each set a guard 17, is securely fastened. The guards occupy an upright position, as shown in Fig. 4. At their inner ends the guards are attached to the body beam 11, and in each guard a set of vertical knives 18 have sliding movement, the knives being preferably of the same type employed in harvesters; the guards 17, are provided with fingers through which the knives pass. The knife bars 18$^a$, extend over and upon the body beam 11, and each set of knife bars is connected with a block 19. The blocks are pivotally attached to the outer ends of the levers designated in the drawings as 20 and 21, the levers being pivoted at their centers upon the body beam, as shown best in Fig. 2. Links 22 and 23, are pivotally connected with the inner ends of the levers 20 and 21, and the rear ends of the links are preferably connected by means of the same pivot pin to a third longer lever 24, the latter lever being fulcrumed at its center upon the rear portion of the body beam, as is likewise shown in Fig. 1. The outer end of this lever 24, is connected with a pitman 25, and the pitman at its opposite end is connected by means of a wrist pin 26, with a pinion 27, journaled upon a short shaft 28, supported by a bracket, or its equivalent preferably semi-circular and slotted for the passage of the shaft 28, and attached to the wagon 14; and the pinion 27, is made to mesh with a gear 29, said gear being securely fastened to the hub of one of the rear wheels 30 of the wagon, as shown in Figs. 1 and 5. The inner chutes of the sets are connected by a guard 31, preferably made of steel, the guard being connected with the chutes at the forward ends of their inner faces, and at the corresponding point of each outer chute a single guard 32, is securely fastened, the outer guards being curved outwardly while the inner guard 31, is shaped somewhat as the lower portion of a shield, and by reason of these guards a passage 33, is provided, leading directly into the space between the chutes 15 and 16.

The outer end of the body beam 11, is provided with a short axle upon which a supporting wheel 34, is journaled. When the machine is not in use it may be carried upward to a vertical position and attached in any approved manner to the wagon body.

In operation, as the machine is drawn over a field of corn, one row of corn is made to enter between the guards, at one side of the machine, while another row enters between the guards at the opposite end of the machine, and the revolution of the wheels of the wagon imparts to the working lever 24 a laterally vibratory movement and said lever in its turn imparts a similar movement to the small levers 20 and 21, and these levers impart a lateral reciprocating movement to the knives 18. As the machine advances the corn stalks are pressed downward and the ears are brought in engagement with the knives and are cut from the stalks, the ears dropping to the right and left in the chutes 15 and 16, from whence they pass to the receiver 10, and a person stationed in the receiver, or following it, may readily toss the ears from the receiver into the body of the wagon. By this means it will be observed that the ears of corn may be expeditiously and conveniently harvested, the stalks remaining in the ground.

Having thus described my invention, I claim as new and desire to secure by Letters Patent—

1. The combination, with the frame and the transverse receiver 10, of the pairs of forwardly projecting chutes delivering at their rear ends into the said receiver, guides for guiding the stalks into the spaces between the chutes of each pair and longitudinally and vertically extending knives along the adjacent sides of the chutes of each pair, substantially as set forth.

2. The combination with the frame and the transverse receiver provided with forwardly extending pairs of chutes, and the guides for guiding the stalks into the spaces between the chutes of each pair, of the longitudinally extending reciprocating knives along the adjacent sides of the troughs of each pair with their cutting edges uppermost, levers pivoted between their ends, and connected at their opposite ends to the knives and a lever 24 pivoted between its ends, pivotally connected at its inner end with the adjacent ends of the first named levers and at its outer end connected with an operating mechanism, substantially as set forth.

3. The combination, with a wagon, a driving mechanism connected with the wagon and a body beam having a hinged connection with the wagon body, of a receptacle attached to the body beam, chutes arranged in pairs, located in front of the receptacle and communicating therewith, the chutes of a pair being arranged at a given distance apart, fenders projected from the forward inner faces of the chutes, knives having sliding movement at the inner side edges of the chutes, levers connected with the knives and fulcrumed upon the beam, and a driving connection between the levers and the driving mechanism of the wagon, as and for the purpose specified.

JAMES EDWARD PERKINS.

Witnesses:
W. A. STOVEY,
JOHN KENNEDY.